United States Patent Office 3,103,974
Patented Sept. 17, 1963

3,103,974
METHOD OF SELECTIVELY PLUGGING FORMATIONS
John A. Sievert, Francis R. Conley, and John N. Dew, Ponca City, Okla., assignors to Continental Oil Company, Ponca City, Okla., a corporation of Delaware
No Drawing. Filed Mar. 18, 1960, Ser. No. 15,838
10 Claims. (Cl. 166—30)

This invention broadly relates to a method of plugging a subterranean formation which is traversed by a well bore. Specifically, the invention is a method for selectively depositing sugar in crystalline form within the pore spaces of the permeable portions of the formation.

It is desirable during many standard operations in the production of hydrocarbons to plug the more permeable portions of the formations for various reasons. The formation can be plugged to achieve a uniform movement of the hydrocarbons from within the formation in order to avoid channeling with recovery only through a minimum portion of the more permeable zone. It is often necessary to plug permeable zones about an injection well bore in order that fluids injected into the formation will be diffused in a uniform manner.

It is an object of this invention to provide a method for plugging permeable portions of subterranean formations. It is another object of this invention to provide a method of plugging a formation with increased facility by the use of fluid constituents.

It is a further object of this invention to provide a method of plugging the permeable portions of a subterranean formation in a selective manner in order that the most permeable zones are effectively plugged.

Another object of this invention is to provide a method of plugging a portion of the subterranean formation wherein said plug is readily removable as the operations require.

Other objects and advantages of this invention will be apparent to those skilled in the art from the following description of the invention.

Broadly, this invention is a method for selectively plugging a formation wherein a volume of alcohol is injected into the formation surrounding a well bore whereafter an injection of a sugar in water solution is made into said formation whereby sugar crystallizes and precipitates into the pore spaces to effectively plug the permeable portions of the formation.

The method of the present invention can be applied to any formation which is traversed by a well bore and the initial step of this method is the injection of a volume of alcohol. The alcohol which is to be injected into the formation surrounding the well bore should be a water-miscible alcohol, preferably methyl alcohol, ethyl alcohol, tertiary-butyl alcohol, propyl alcohol, or isopropyl alcohol, in order that the injected volume will have the requisite properties to perform the desired crystallization. The volume of alcohol depends upon the thickness of the portion of the formation which it is desirable to selectively plug but it should be a volume sufficient to provide a zone of substantially 100 percent alcohol extending a minimum of two feet outwardly from the well bore. This volume of alcohol can extend to a radius in excess of the aforementioned two feet, dependent upon the individual characteristics of the formation. The volume of injected alcohol effectively displaces any connate water present in the formation which could possibly have a diluting effect upon the subsequent step of injecting a sugar and water solution.

The next step of the method of this invention is to inject a solution of sugar in water through the well bore and into the formation in order to provide the necessary selective plugging agent. The water can be any water which is available such as stock water or other water available at the site. The sugars which can be utilized are any sugars which are economically feasible, but preferably those of a disaccharide classification, particularly sucrose. The solution should be essentially saturated with respect to sugar or as close thereto as the conditions of the formation will allow in order to selectively plug the formation completely. The volume of the sugar in water solution should preferably be injected at a low rate in order that the crystallization will occur with the greatest facility. The volume of sugar in water concentration should be sufficient to provide enough sugar to effectively plug the pore spaces of those selective portions of the formation and can be determined by equations known in the art. The concentration can be maintained at less than 100 percent in order to provide a partial selective plugging of a uniform nature.

The next step of the method of the invention disclosed herein is to allow the well bore to be shut-in for a period, preferably 24 hours, in order that the sugar injected in solution will have sufficient time to contact the alcohol previously injected therein. The alcohol is miscible with the water also in order to allow the sugar in water solution to pass into the zone of injected alcohol whereby the sugar contacts the alcohol. Upon contacting the alcohol, the sugar is precipitated from the sugar in water solution in crystalline form into the pore spaces of the subterranean formation thereby effectively plugging those portions of the formation wherein the solution has been injected. The selectiveness of the plugging is accomplished due to the fact that the sugar in water solution inherently occurs in greatest amounts in the most permeable portions of the formation, thereby furnishing the greater volumes of sugar for precipitation to selectively plug those portions of the formation having greater permeability.

The ultimate step of the present method of selectively plugging a formation is the removal of said plug in the event that operations make it desirable to do so. The crystalline sugar plug can be effectively removed by injecting water into the formation surrounding the well bore wherein the sugar crystals have been previously precipitated into the pore spaces. This water injection causes the sugar to be once again incorporated into a solution which can be flushed from the formation by standard methods well known in the art. The formation is thereby substantially returned to its original structural condition. This method can be repeated as the conditions of the formation require in order to effectively produce the hydrocarbons from within the reservoir or otherwise condition the formation.

The steps of the method of this invention can be altered in that the alcohol and the sugar in water solution can be injected in alternate slugs which provides the desired selective plugging to a more effective degree in certain cases where the structural conditions of the reservoir make it desirable. Among such structural conditions are those in which the portion of the formation to be plugged is more permeable and the pore spaces are relatively large. Under these conditions, better packing of the crystalline sugar may be had in the pores by introducing a plurality of alternately injected volumes of sugar and alcohol thereto. This process gives rise to a step-wise build-up of crystalline sugar in the pore spaces. In this regard, after the initial alcohol is injected, the initial injection of a volume of the sugar in water solution can be followed by a subsequent volume of alcohol. This provides a great degree of flexibility in utilizing the method of the present invention and enables the features to be utilized in virtually every formation.

The following laboratory data was obtained by experimental efforts which will be set forth below together with the accompanying data. A cylindrical core of Alundum 30.7 centimeters long, having a cross sectional area of 23.8 cm.$^2$ and a porosity of 21.1% having a liquid permeability of 235 millidarcies was saturated with tertiary-butyl alcohol. Thereafter three successive volumes, ranging in size from 1.6 cm. to 7 cm. in length as measured along the alundum core, of a sugar in water solution of 75 percent sugar saturation were alternately injected into the core together with three equal volumes of tertiary-butyl alcohol.

Between each volume of the sugar in water solution injected, a 24 hour waiting period was allowed to transpire. After the alternate volumes of an alcohol and a sugar in water solution were injected into the core, tertiary-butyl alcohol was flushed through the core to remove any mobile sugar in water solution. The permeability of the core to alcohol was measured at this time and determined to be 46 millidarcies. The core was then flushed with fresh water under a pressure gradient of 19 p.s.i./ft. in an attempt to wash out the plug and the permeability of the core to water was recorded. The data obtained from the flushing phase are included in Table I.

TABLE I

| Amount of Water Injected (pore volumes) | Liquid Permeability (md.) |
| --- | --- |
| 29 | 23 |
| 35 | 11 |
| 55 | 109 |
| 78 | 175 |
| 109 | 196 |
| 114 | 216 |

This data effectively establishes the reduction in permeability of the core when utilizing a solution of reduced concentration.

In order to disclose still more clearly the nature of the present invention and advantages thereof, reference will hereinafter be made to specific embodiments which illustrate the flexibility of the process. It should be clearly understood, however, that this is done solely by way of example and is not to be construed in limitation of the spirit and scope of the appended claims.

*Example I*

The Tensleep formation in the South Elk Basin field located in Wyoming is traversed by a well bore at a depth between 6990 and 7090 feet. Permeability of the formation was determined to be 500 md. between 6990 feet and 6995 feet and 190 md. between 6995 feet and 7090 feet, with the porosity of the upper portion of the formation being 15.0 percent and the lower being 13.0 percent.

A volume of 70 gallons of ethyl alcohol injected into the formation between 6990 and 6995 feet displaces the hydrocarbon and water from around the well bore to a radius of approximately 2 feet, where the pore spaces are filled with substantially 100 percent alcohol. A saturated sugar in water solution is injected into the formation in a volume of 70 gallons which provides sufficient sugar to selectively plug the pore spaces of the formation and reduces the permeability to approximately 50 md. to 100 md. through the formation surrounding the well bore in the interval 6990 to 6995 feet.

*Example II*

The Tensleep formation in the South Elk Basin field located in Wyoming is traversed by a well bore at a depth between 6990 and 7090 feet. Permeability of the formation was determined to be 500 md. between 6990 feet and 6995 feet and 190 md. between 6995 feet and 7090 feet, as above.

A volume of 70 gallons of ethyl alcohol injected into the formation displaces the hydrocarbon and water from around the well bore to a radius of approximately 2 feet, where the pore spaces are filled with substantially 100 percent alcohol. Thereafter a saturated sugar in water solution is injected into the formation in alternate volumes of 20 gal. and 20 gal. of ethyl alcohol until a total volume of 80 gal. of the sugar in water solution was injected. This provides sufficient sugar to selectively plug the most permeable portions of the formation and reduces the permeability to approximately 50 md. in the interval 6990 feet to 6995 feet.

While particular embodiments of the invention have been described, it will be understood, of course, that the invention is not limited thereto since many modifications may be made, and it is, therefore contemplated to cover by the appended claims any such modifications as fall within the true spirit and scope of the invention.

The invention having thus been described, what is claimed and desired to be secured by Letters Patent is:

1. A method of selectively plugging a subterranean formation traversed by a well bore which comprises injecting a volume of water-miscible alcohol into the formation surrounding said well bore sufficient to fill the pore spaces of the formation surrounding the well bore to a radius of at least two feet, injecting a volume of a sugar in water solution into the formation surrounding said well bore, and shutting-in the well to allow precipitation of the sugar into the formation wherein a selective plug is defined by the sugar in precipitated form.

2. A method of selectively plugging a subterranean formation traversed by a well bore which comprises injecting a volume of water-miscible alcohol into the formation surrounding said well bore, sufficient to fill the pore spaces of the formation surrounding the well bore to a radius of at least two feet, injecting alternate volumes of a sugar in water solution and additional alcohol into the formation surrounding said well bore, and shutting-in the well bore wherein a selective plug is defined by the sugar in precipitated form.

3. A method as set forth in claim 1 wherein the water-miscible alcohol is methyl alcohol.

4. A method as set forth in claim 1 wherein the water-miscible alcohol is ethyl alcohol.

5. A method as set forth in claim 1 wherein the water-miscible alcohol is propyl alcohol.

6. A method as set forth in claim 1 wherein the water-miscible alcohol is isopropyl alcohol.

7. A method as set forth in claim 1 wherein the water-miscible alcohol is tertiary-butyl alcohol.

8. A method as set forth in claim 4 wherein the sugar is a disaccharide sugar.

9. A method as set forth in claim 1 wherein the concentration of the sugar and water solution is 100 percent.

10. The method of claim 8 wherein said shutting-in comprises a period of at least twenty-four hours.

References Cited in the file of this patent
UNITED STATES PATENTS

| 2,034,347 | Loomis et al. | Mar. 17, 1936 |
| 2,347,484 | Lawton | May 9, 1944 |
| 2,379,561 | Bennett | July 3, 1945 |
| 2,771,138 | Beeson | Nov. 20, 1956 |

OTHER REFERENCES

Fieser: Experiments in Organic Chemistry, 2nd edition, published 1941 by D. C. Health and Co., page 121.